(12) United States Patent
Cheng et al.

(10) Patent No.: US 12,411,382 B2
(45) Date of Patent: Sep. 9, 2025

(54) DISPLAY MODULE AND DISPLAY DEVICE

(71) Applicants: Beijing BOE Display Technology Co., Ltd., Beijing (CN); BOE Technology Group Co., Ltd., Beijing (CN)

(72) Inventors: Qian Cheng, Beijing (CN); Hetao Wang, Beijing (CN); Xin Gai, Beijing (CN); Chunlei Xiao, Beijing (CN); Fanglin Li, Beijing (CN); Tianyang Han, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/283,825

(22) PCT Filed: Aug. 30, 2022

(86) PCT No.: PCT/CN2022/115964
§ 371 (c)(1),
(2) Date: Sep. 25, 2023

(87) PCT Pub. No.: WO2024/044989
PCT Pub. Date: Mar. 7, 2024

(65) Prior Publication Data
US 2025/0076709 A1    Mar. 6, 2025

(51) Int. Cl.
G02F 1/13357    (2006.01)
G02F 1/1335     (2006.01)

(52) U.S. Cl.
CPC .. G02F 1/133608 (2013.01); G02F 1/133603 (2013.01); G02F 1/133607 (2021.01)

(58) Field of Classification Search
CPC ......... G02F 1/133608; G02F 1/133603; G02F 1/133607
See application file for complete search history.

(56) References Cited

U.S. PATENT DOCUMENTS

| | | | | |
|---|---|---|---|---|
| 10,228,589 | B2* | 3/2019 | Yang | G02F 1/133608 |
| 10,261,353 | B2* | 4/2019 | Chen | G02F 1/133553 |
| 2017/0315408 | A1* | 11/2017 | Lee | G02F 1/133605 |
| 2018/0203277 | A1* | 7/2018 | Nagayama | G02F 1/1333 |
| 2021/0033912 | A1 | 2/2021 | Xiao | |

(Continued)

FOREIGN PATENT DOCUMENTS

| | | | | |
|---|---|---|---|---|
| CN | 105954928 A | * | 9/2016 | G02B 6/0055 |
| CN | 206991655 U | | 2/2018 | |
| CN | 207232584 U | | 4/2018 | |

(Continued)

*Primary Examiner* — Tsion Tumebo
(74) *Attorney, Agent, or Firm* — XSENSUS LLP

(57) ABSTRACT

Provided is a display module. The display module includes: a display panel; an adhesive layer; and a backlight module including a backlight source, a frame body, and an optical film, wherein the frame body includes a bearing stage, a support stage, and a barrier wall, wherein the bearing stage includes a bearing face configured to bear the optical film, the support stage is affixed to the bearing face, and the barrier wall is affixed to a face, facing away from the bearing face, of the support stage; wherein the adhesive layer includes a first adhesive portion and a second adhesive portion.

19 Claims, 9 Drawing Sheets

(56) References Cited

U.S. PATENT DOCUMENTS

| | | | |
|---|---|---|---|
| 2021/0149230 A1* | 5/2021 | Lee | G02F 1/133603 |
| 2022/0236604 A1 | 7/2022 | Dong et al. | |

FOREIGN PATENT DOCUMENTS

| | | | | |
|---|---|---|---|---|
| CN | 208027039 U | | 10/2018 | |
| CN | 208255580 U | | 12/2018 | |
| CN | 110379303 A | | 10/2019 | |
| CN | 209946590 U | * | 1/2020 | ....... G02F 1/133308 |
| CN | 210155469 U | | 3/2020 | |
| CN | 111562695 A | | 8/2020 | |
| CN | 211741773 U | | 10/2020 | |
| CN | 112764254 A | | 5/2021 | |
| CN | 213634045 U | | 7/2021 | |
| CN | 214795497 U | | 11/2021 | |
| CN | 215067622 U | | 12/2021 | |
| CN | 114839809 A | | 8/2022 | |
| CN | 217112995 U | | 8/2022 | |
| TW | 0479033 B | * | 3/2002 | |
| WO | WO-2023185313 A1 | * | 10/2023 | ....... G02F 1/133308 |

* cited by examiner

DISPLAY MODULE AND DISPLAY DEVICE

CROSS-REFERENCE TO RELATED APPLICATION

This application is a U.S. national stage of international application No. PCT/CN2022/115964, filed on Aug. 30, 2022, the disclosure of which is incorporated herein by reference in its entirety.

TECHNICAL FIELD

The present disclosure relates to the field of display technologies, and in particular, relates to a display module and a display device.

BACKGROUND OF THE INVENTION

For enhancement of comfort of users during use of display devices, narrow-frame display devices with a larger screen and a narrow frame have been developed. In some practices, the display device generally includes a backlight module and a liquid crystal display panel. The backlight modules include a direct backlight module and a side-edge backlight module. The narrow frame display device is easily acquired based on the direct backlight module.

SUMMARY OF THE INVENTION

Embodiments of the present disclosure provide a display module and a display device. The technical solutions are as follows.

In some embodiments of the present disclosure, a display module is provided. The display module includes:
- a display panel;
- an adhesive layer; and
- a backlight module including a backlight source, a frame body, and an optical film, wherein
- the frame body includes a bearing stage, a support stage, and a barrier wall, wherein the bearing stage includes a bearing face configured to bear the optical film, the support stage is affixed to the bearing face, and the barrier wall is affixed to a face, facing away from the bearing face, of the support stage; wherein
- the adhesive layer includes a first adhesive portion and a second adhesive portion, wherein the first adhesive portion is disposed between the barrier wall and the display panel and is bonded to the barrier wall and the display panel, the second adhesive portion is disposed between the support stage and the display panel and is bonded to the support stage and the display panel, and the second adhesive portion is closer to an edge of the display module than the first adhesive portion is.

In some embodiments, a minimum width $d_1$ of a cross-section of the barrier wall and a width $d_3$ of a side, close to the barrier wall, of a cross-section of the support stage meet: $d_1 \leq d_3/2$.

In some embodiments, a face, close to the optical film, of the barrier wall is flush with a face, close to the optical film, of the support stage.

In some embodiments, the minimum width $d_1$ of the cross-section of the barrier wall and the width $d_3$ of the side, close to the barrier wall, of the cross-section of the support stage meet: $d_1 \geq d_3/4$.

In some embodiments, in a direction perpendicular to a plane of a light exiting face of the display panel, a minimum height h of the barrier wall and a minimum distance H between the support stage and the display panel meet: $H/4 \leq h \leq 3H/4$.

In some embodiments, in a direction perpendicular to a plane of a light exiting face of the display panel, a minimum distance between the display panel and the support stage is greater than or equal to 0.2 mm; and/or, in the direction perpendicular to the plane of the light exiting face of the display panel, the minimum distance between the display panel and the support stage is less than or equal to 0.5 mm.

In some embodiments, a maximum width of a cross-section of the adhesive layer is greater than or equal to 1 mm.

In some embodiments, the adhesive layer further includes an overflowed adhesive portion on a side, facing away from the second adhesive portion, of the first adhesive portion, wherein the overflowed adhesive portion is bonded to the display panel; and the display panel includes a plurality of valid sub-pixels arranged in an array, and a maximum width of a cross-section of the overflowed adhesive portion is less than or equal to an overall width of two valid sub-pixels closest to an edge of a display region of the display panel.

In some embodiments, in a direction perpendicular to a plane of a light exiting face of the display panel, a maximum thickness of the overflowed adhesive portion is less than or equal to twice a minimum distance between the display panel and the barrier wall.

In some embodiments, the cross-section of the overflowed adhesive portion includes an adhesive face and an arc-shaped face, wherein the adhesive face is bonded to the display panel, the arc-shaped face is disposed on a side, facing away from the display panel, of the adhesive face, and a maximum distance between the arc-shaped face and the display panel is less than or equal to a maximum distance between the support stage and the display panel.

In some embodiments, an area S1' of the cross-section of the overflowed adhesive portion and an area S2 of a cross-section of the barrier wall meet:

$$\frac{\pi \times \left(\frac{H}{0.625}\right)^2}{4} - S1' \leq S2';$$

wherein H represents a minimum distance between the support stage and the display panel.

In some embodiments, relevant dimensions of the barrier wall meet:

$$\begin{cases} S1 = \frac{\pi r^2}{4} + \frac{1}{2} \times (b+r) \times (a-r) \\ r = h0 \\ S2 = d_1 \times h \\ \frac{\pi \times \left(\frac{H}{0.625}\right)^2}{4} - S1 \leq S2 \end{cases};$$

wherein H represents a minimum distance between the support stage and the display panel, $d_1$ represents a minimum width of a cross-section of the barrier wall, h represents a minimum height of the barrier wall in a direction perpendicular to a plane of a light exiting face of the display panel, r represents a radius of the arc-shaped face, h0 represents a maximum thickness of the overflowed adhesive portion, b represents a minimum distance between the barrier wall and the display panel, and a represents the overall width of two valid sub-pixels closest to the edge of the display region.

In some embodiments, relevant dimensions of the barrier wall meet:

$$\begin{cases} S1 = \dfrac{\pi r^2}{4} + \dfrac{1}{2} \times (b+r) \times (a'-r) \\ r = h0 \\ S2 = d_1 \times h \\ \dfrac{\pi \times \left(\dfrac{H}{0.625}\right)^2}{4} - S1 \leq S2 \end{cases} ;$$

wherein H represents a minimum distance between the support stage and the display panel, $d_1$ represents a minimum width of a cross-section of the barrier wall, h represents a minimum height of the barrier wall in a direction perpendicular to a plane of a light exiting face of the display panel, r represents a radius of the arc-shaped face, h0 represents a maximum thickness of the overflowed adhesive portion, b represents a minimum distance between the barrier wall and the display panel, and a' represents a distance between an orthogonal projection of an edge, away from the edge of the display region, of a second valid sub-pixel closest to the edge of the display region of the display panel on the display panel and an orthogonal projection of the barrier wall on the display panel.

In some embodiments, a shear resistance strength P of the adhesive layer meets:

$$P \geq \dfrac{m \times g}{12 \times s};$$

wherein m represents a mass of the display panel, g represents gravitational acceleration, and s represents a minimum area of a cross-section of the adhesive layer.

In some embodiments, the adhesive layer is formed by curing an optical adhesive.

In some embodiments, at least two barrier walls are juxtaposed on a face, facing away from the bearing face, of the support stage, a gap is defined between any two adjacent barrier walls, and the adhesive layer further includes an auxiliary adhesive portion in the gap.

In some embodiments, the display panel further includes a display region and a non-display region on a periphery of the display region, and a width of a side, close to the barrier wall, of a cross-section of the support stage is less than or equal to a width of the non-display region.

In some embodiments, a boundary of the display region is flush with a face, close to the optical film, of the support stage.

In some embodiments, the display module further includes: a plurality of barrier walls extending along an edge of the display module, wherein the plurality of barrier walls are disposed on a plurality of side faces of the display module, and orthogonal projections of the plurality of barrier walls on the display panel surround the display region of the display panel.

In some embodiments, the non-display region includes a bonding region, wherein the bonding region is disposed on a first side of the display region, and the orthogonal projections of the plurality of barrier walls on the display panel are on other sides of the display region than the first side.

In some embodiments, the backlight module further includes: a light guide structure on the bearing face of the bearing stage, wherein the support stage is closer to the edge of the display module than the light guide structure is, and the optical film is disposed on a side, facing away from the bearing face, of the light guide structure.

In some embodiments, the backlight module further includes: a backplane, wherein the backplane is disposed on a side, facing away from the display panel, of the optical film, the frame body is affixed to the backplane, and the backlight source is disposed between the backplane and the optical film.

In some embodiments, the frame body further includes: a surrounding structure fixedly connected to the bearing stage, wherein the surrounding structure surrounds the backlight source, and a side, close to the backlight source, of the surrounding structure is provided with a reflective layer.

In some embodiments, the optical film includes at least one of: a diffuse plate, a lower prism sheet, and an upper prism sheet.

In some embodiments of the present disclosure, a display module is provided. The display module includes:

a display panel;

an optical film attached to a light entering face of the display panel;

a frame body on a side, facing away from the display panel, of the optical film, wherein the frame body includes: a support stage and a barrier wall, wherein the barrier wall is affixed to a face, facing away from the bearing face, of the support stage;

an adhesive layer, wherein the adhesive layer includes: a first adhesive portion and a second adhesive portion, wherein the first adhesive portion is disposed between the barrier wall and the display panel and is bonded to the barrier wall and the optical film, the second adhesive portion is disposed between the support stage and the display panel and is bonded to the support stage and the optical film, and the second adhesive portion is closer to an edge of the display module than the first adhesive portion is.

In some embodiments of the present disclosure, a display device is provided. The display device includes a plurality of spliced display modules, wherein the display module includes the above display module.

BRIEF DESCRIPTION OF DRAWINGS

For clearer description of the technical solutions in the embodiments of the present disclosure, the following briefly describes the accompanying drawings required for describing the embodiments. Apparently, the accompanying drawings in the following description show merely some embodiments of the present disclosure, and those of ordinary skill in the art may still derive other drawings from these accompanying drawings without any creative efforts.

DETAILED DESCRIPTION OF THE INVENTION

To make the objectives, technical solutions, and advantages of the present disclosure clearer, the embodiments of the present disclosure are further described in detail hereinafter with reference to the accompanying drawings.

The conventional direct backlight module generally includes an optical film, a light plate, a frame body, and a backplane. The optical film and the light plate are generally laminated, the frame body is configured to wrap the optical film and the light plate, and the backplane is configured to support the light plate. In assembling the backlight module and the display panel, an adhesive layer requires to be disposed between the display panel and the frame body in the backlight module, and the adhesive layer is separately bonded to the display panel and the frame body.

However, a frame of the current display device is becoming increasingly narrow, and a distance between an outer boundary of a display region of the display device and an inner boundary of the frame body in the backlight module is becoming increasingly less. In this case, in bonding the display panel to the frame body by the adhesive layer, the adhesive layer between the display panel and the frame body is prone to adhesive overflow, and the overflowed adhesive is distributed in the display region, such that a display effect of the display device is poor.

Figure 1:
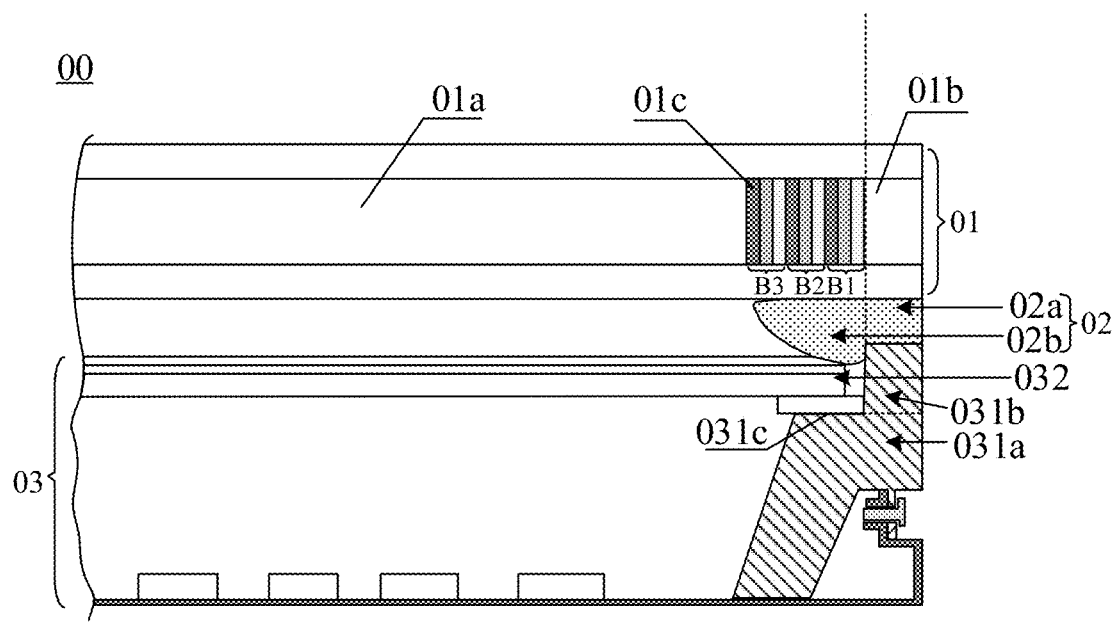
FIG. 1 is a schematic structural diagram of a display module.

Referring to FIG. 1, FIG. 1 is a schematic structural diagram of a display module. The display module 00 includes a display panel 01, an adhesive layer 02, and a backlight module 03.

The display panel 01 includes a display region O1a and a non-display region 01b on a periphery of the display region O1a. The display region O1a of the display panel 01 is coincided with a display region of the display module. The display region O1a of the display panel 01 includes a plurality of sub-pixel region 01c arranged in an array. One sub-pixel is disposed in each sub-pixel region 01c. Each three adjacent sub-pixels in the display panel 01 are configured to compose one pixel. For example, three pixels on an edge portion of the display panel 01 in FIG. 1 are a pixel B1, a pixel B2, and a pixel B3, and the pixel B1 is closest to the non-display region 01b. Pixels in the row of the pixel B1 are a first row of pixels close to the non-display region 01b, pixels in the row of the pixel B2 are a second row of pixels close to the non-display region 01b, and pixels in the row of the pixel B3 are a third row of pixels close to the non-display region 01b.

The backlight module 03 includes a frame body 031 and an optical film 032. The frame body 03 includes a bearing stage 031a and a support stage 031b. The bearing stage 031a is provided with a bearing face 031c for bearing the optical film 032, and the support stage 031b is affixed to the bearing face 031c of the bearing stage 031a.

In assembling the backlight module 03 and the display panel 01, an adhesive layer 02 requires to be disposed between the display panel 01 and the support stage 031b in the frame body 031 of the backlight module 03. As such, the display panel 01 is bonded to the support stage 031b in the frame body 031 by the adhesive layer 02, such that connection between the display panel 01 and the backlight module 03 is achieved.

However, a frame of the current display module is increasingly narrow, a boundary of the display region of the display module is flush with a face, close to the optical film 032, of the support stage 031b in the frame body 031, and a face, facing away from the optical film 032, of the support stage 031b does not exceed the display panel 01. Thus, a width of the support stage 031b is less, and the adhesive layer 02 between the display panel 01 and the support stage 031b is prone to adhesive overflow in bonding the display panel 01 and the support stage 031b by the adhesive layer 02. For example, the adhesive layer 02 includes an adhesive portion 02a between the display panel 01 and the support stage 031b and an overflowed adhesive portion 02b on a side of the adhesive portion 02a. The overflowed adhesive portion 02b in the adhesive layer 02 is disposed in the display region of the display module, and a width of the overflowed adhesive portion 02b is generally great. For example, the width of the overflowed adhesive portion 02b is generally greater than a width of two pixels (that is, six sub-pixel regions 01c). Thus, in bonding the display panel 01 and the support stage 031b by the adhesive layer 02, the overflowed adhesive of the overflowed adhesive portion 02b in the adhesive layer 02 stops in the case that the overflowed adhesive portion 02b in the adhesive layer 02 reaches the third row of pixels close to the non-display region 01b.

Figure 2:
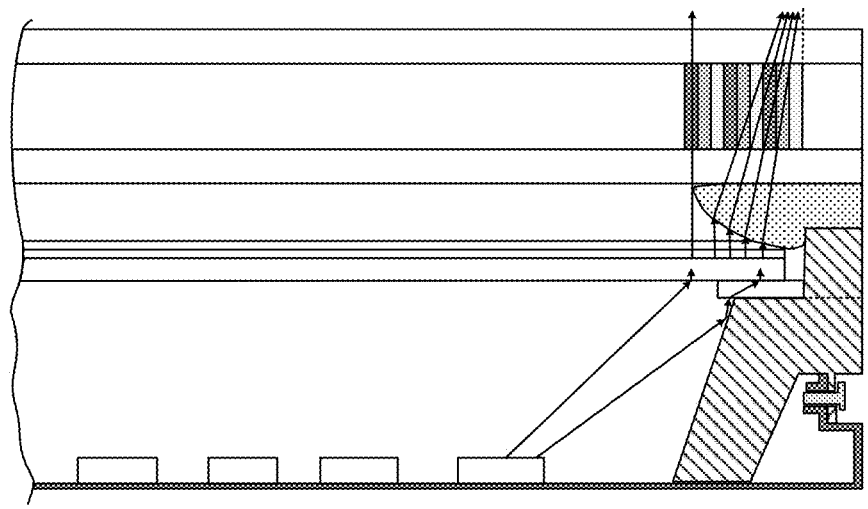
FIG. 2 is a light path of light emitted by a backlight module in the display module shown in FIG. 1.

In the case that the width of the overflowed adhesive portion 02b in the adhesive layer 02 is great, the overflowed adhesive portion 02b in the adhesive layer 02 affects the display effect of the display panel 01. For example, referring to FIG. 2, FIG. 2 is a light path of light emitted by a backlight module in the display module shown in FIG. 1. A face, facing away from the display panel 01, of the overflowed adhesive portion 02b in the adhesive layer 02 is a curved face, light emitted from the backlight module 03 to the second row of pixels close to the non-display region 01b is refracted upon passing thorough the curved face, and most refracted light is exited from the first row of pixels close to the non-display region 01b. As such, light emitted from the backlight module 03 and exited from the second row of pixels close to the non-display region 01b is less, such that the poor phenomenon of dark lines is caused in the edge portion of the screen displayed by the display panel 01. As such, the display effect of the display panel 01 is poor.

Figure 3:
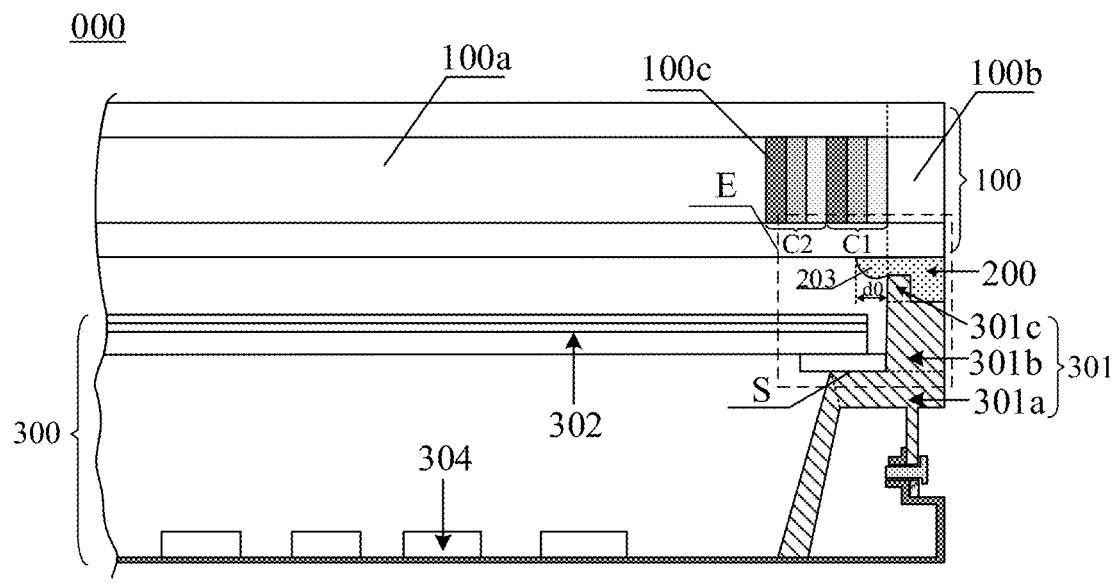
FIG. 3 is a schematic structural diagram of a display module according to some embodiments of the present disclosure.

Referring to FIG. 3, FIG. 3 is a schematic structural diagram of a display module according to some embodiments of the present disclosure. The display module 000 includes: a display panel 100, an adhesive layer 200, and a backlight module 300.

The backlight module 300 in the display module 000 includes: a backlight source 304, a frame body 301, and an optical film 302. The frame body 301 surrounds the backlight source 304 and the optical film 302, and the optical film 302 is connected to the frame body 301. For example, the optical film 302 homogenizes the backlight.

The adhesive layer 200 in the display module 000 is bonded to the frame body 301 and the display panel 100. The optical film 302 in the backlight module 300 is closer to the display panel 100 than the backlight source 304 is. The adhesive layer 200 is formed by curing the optical adhesive. For example, the optical adhesive is viscous. Thus, in assembling the frame body 301 and the display panel 100 by the adhesive layer 200, the overflowed adhesive occurs in the adhesive layer 200. For example, the adhesive layer 200 includes adhesive portions (that is, a first adhesive portion 201 and a second adhesive portion 202) between the display panel 100 and the frame body 301 and an overflowed adhesive portion 203 on a side of the adhesive portion. The overflowed adhesive portion 203 of the adhesive layer 200 is disposed in the display region of the display module.

The display panel 100 in the display module 000 includes a display region 100a and a non-display region 100b on a periphery of the display region 100a. The display region 100a of the display panel 100 is coincided with the display region of the display module. The display panel 100 includes: a plurality of valid sub-pixels 100c arranged in an array. The plurality of valid sub-pixels 100c are arranged in the display region 100a. Each three adjacent valid sub-pixels compose one pixel. For example, three valid sub-pixels in each pixel are a red sub-pixel, a green sub-pixel, and a blue sub-pixel. Both the pixel C1 and the pixel C2 in the edge portion of the display panel 100 in FIG. 3 include three sub-pixels, and the pixel C1 is closer to the non-display region 100b. Pixels in the row of the pixel C1 are a first row of pixels close to the non-display region 100b, and pixels in the row of the pixel C2 are a second row of pixels close to the non-display region 100b. The first row of pixels is a row of pixels in the display region 100a closest to an edge of the display region 100, and the second row of pixels is a row of pixels in the display region 100a closest to an edge of the display region 100 after the first row of pixels.

It should be noted that in bonding the display panel 100 and the backlight module 300 by the adhesive layer 200, for amounts of the overflowed adhesive at different positions of the adhesive layer 200, other than less positions (for example, a starting position of dispensing of the dispensing process for forming the adhesive layer 200), amounts of the overflowed adhesive at most positions are the same. Thus, in the overflowed adhesive portion 203 of the adhesive layer 200, shapes and sizes of cross-sections of most positions other than these less positions are the same. The cross-section of the overflowed adhesive portion 203 in the following embodiments refers to the cross-sections at these most positions.

In some embodiments, on at least one side of the display module 000, a distance between an orthogonal projection of a boundary of a side, away from an edge of the display module 000, of the adhesive layer 200 on the display region 100a and the edge of the display region 100a is less than or equal to a distance between an edge, away from the display region 100a, of the first row of pixels closest to the edge of the display region 100a and the edge of the display region 100a.

In some embodiments, on at least one side of the display module 000, the distance between the orthogonal projection of the boundary of the side, away from the edge of the display module 000, of the adhesive layer 200 on the display region 100a and the edge of the display region 100a is less than or equal to a distance between an edge, away from the display region 100a, of the second valid sub-pixel 100c closest to the edge of the display region 100a and the edge of the display region 100a. In some embodiments, the distance between the orthogonal projection of the boundary of the side, away from the edge of the display module 000, of the adhesive layer 200 on the display region 100a and the edge of the display region 100a is greater than a distance between an edge, away from the display region 100a, of the first valid sub-pixel 100c closest to the edge of the display region 100a and the edge of the display region 100a. As such, the bonding strength of the structure is ensured on the premise that the optical effect is not affected. In some embodiments, the valid sub-pixel 100c is in a strip shape, and at least one side of the display module 000 includes a side on which an extension direction of the adhesive layer 200 is the same as an extension direction of the strip sub-pixel. For example, the valid sub-pixel 100c is in a rectangular shape including long sides and short sides, and at least one side of the display module 000 includes a side on which the extension direction of the adhesive layer 200 is the same as an extension direction of the long side of the rectangle. In some embodiments, at least one side of the display module 000 includes two opposite sides of the display module 000.

In some embodiments, on each side of the display module 000, distances between the orthogonal projections of the edges, away from the display module 000, of the adhesive layer 200 on the display region 100a and the edge of the display region 100a are equal.

In some embodiments, a maximum width d0 of a cross-section of the overflowed adhesive portion 203 is less than or equal to an overall width of two valid sub-pixels 100c closest to the edge of the display region 100a. It should be noted that widths of cross-sections of the overflowed adhesive portion 203 at different heights are different, and thus there is a height at which an area of the cross-section of the overflowed adhesive portion 203 is maximum, and the width of the cross-section at the position is the maximum width of the cross-section of the overflowed adhesive portion 203. For example, in FIG. 3, the width of the cross-section of the overflowed adhesive portion 203 at a position closest to the display panel 100 is maximum. The overall width of two valid sub-pixels 100c is an overall distance in the width direction of two continuous sub-pixels 100c. For example, a shape of the valid sub-pixel 100c is a rectangle including long sides and short sides, and a width direction is an extension direction of the short side of the valid sub-pixel 100c.

A cross-section of a structure in the embodiments of the present disclosure is a cross-section perpendicular to a plane of a light-exiting face of the display panel 100 and perpendicular to an extension direction of the structure. For example, the cross-section of the overflowed adhesive portion 203 is a cross-section perpendicular to the plane of the light-exiting face of the display panel 100 and perpendicular to the extension direction of the overflowed adhesive portion 203.

It should be further noted that the display panel 100 is generally provided with a black matrix including a plurality of light holes, and the plurality of light holes in the black matrix are in one-to-one correspondence to the plurality of valid sub-pixels 100c in the display panel 100. With such design, a region of the valid sub-pixel 100c includes a region of the corresponding light hole and a region of a light shielding portion surrounding the light hole. The light shielding portion surrounding the light hole is a portion of the black matrix, and a width of the light shielding portion surrounding the light hole is equal to half a width of a black matrix between two adjacent light holes. Thus, the width of the valid sub-pixel 100c is equal to a sum of a width of the region of the corresponding light hole, a width of the light shielding portion on one side of the light hole, and a width of the light shielding portion on the other side of the light hole. It should be noted that a width of the light shielding portion on a side, close to the edge of the display region 100a, of the valid sub-pixel 100c closest to the edge of the display region 100a is equal to a width of the light shielding portion on a side, away from the edge of the display region 100a, of the valid sub-pixel 100c closest to the edge of the display region 100a.

In some embodiments, widths of the valid sub-pixels 100c are the same, and an overall width of two valid sub-pixels 100c closest to the edge of the display region 100a is equal to twice the width of one valid sub-pixel 100c.

In some embodiments, a boundary of a valid sub-pixel 100c closes to the edge of the display region 100a is coincided with the edge of the display region 100a.

In the embodiments of the present disclosure, in bonding the display panel 100 and the frame body 301 by the adhesive layer 200, the overflowed adhesive of the overflowed adhesive portion 200c in the adhesive layer 200 stops in the case that the overflowed adhesive portion 203 in the adhesive layer 200 reaches the first row of pixels close to the non-display region 01b. As such, even if the overflowed adhesive occurs in the adhesive layer 200 in bonding the display panel 100 and the frame body 301 by the adhesive layer 200 in the embodiments of the present disclosure, the maximum width d0 of the cross-section of the overflowed adhesive portion 203 of the adhesive layer 200 is less, and thus the overflowed adhesive portion 203 does not affect the normal display of the display panel 100.

Figure 4:
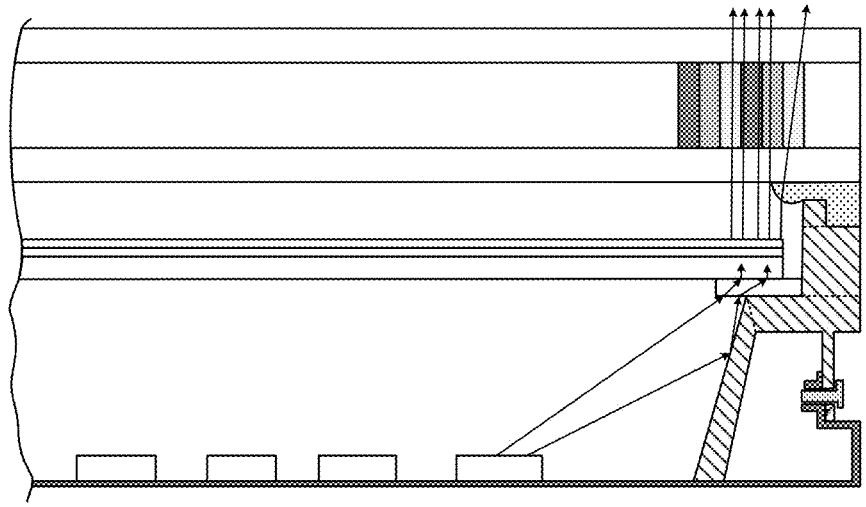
FIG. 4 is a light path of light emitted by a backlight module in the display module shown in FIG. 3.

Referring to FIG. 4, FIG. 4 is a light path of light emitted by a backlight module in the display module shown in FIG. 3. In the case that the maximum width d0 of the cross-section of the overflowed adhesive portion 203 of the adhesive layer 200 is less, light emitted from the backlight module 300 to the second row of pixels close to the non-display region 01b is not disturbed by the overflowed adhesive portion 203, and is normally exited from the second row of pixels close to the non-display region 01b. In addition, although the light emitted from the backlight module 300 to the first row of pixels close to the non-display region 01b is refracted by the overflowed adhesive portion 203, the refraction of the light by the overflowed adhesive portion 203 is poor as the maximum width d0 of the cross-section of the overflowed adhesive portion 203 is less. Thus, the light emitted to the first row of pixels close to the non-display region 01b is also normally exited from the row of pixels. As such, the possibility of poor phenomenon of dark lines in an edge portion of a screen displayed by the display panel 100 is efficiently reduced, and a display effect of the display panel 100 is efficiently improved.

Figure 5:
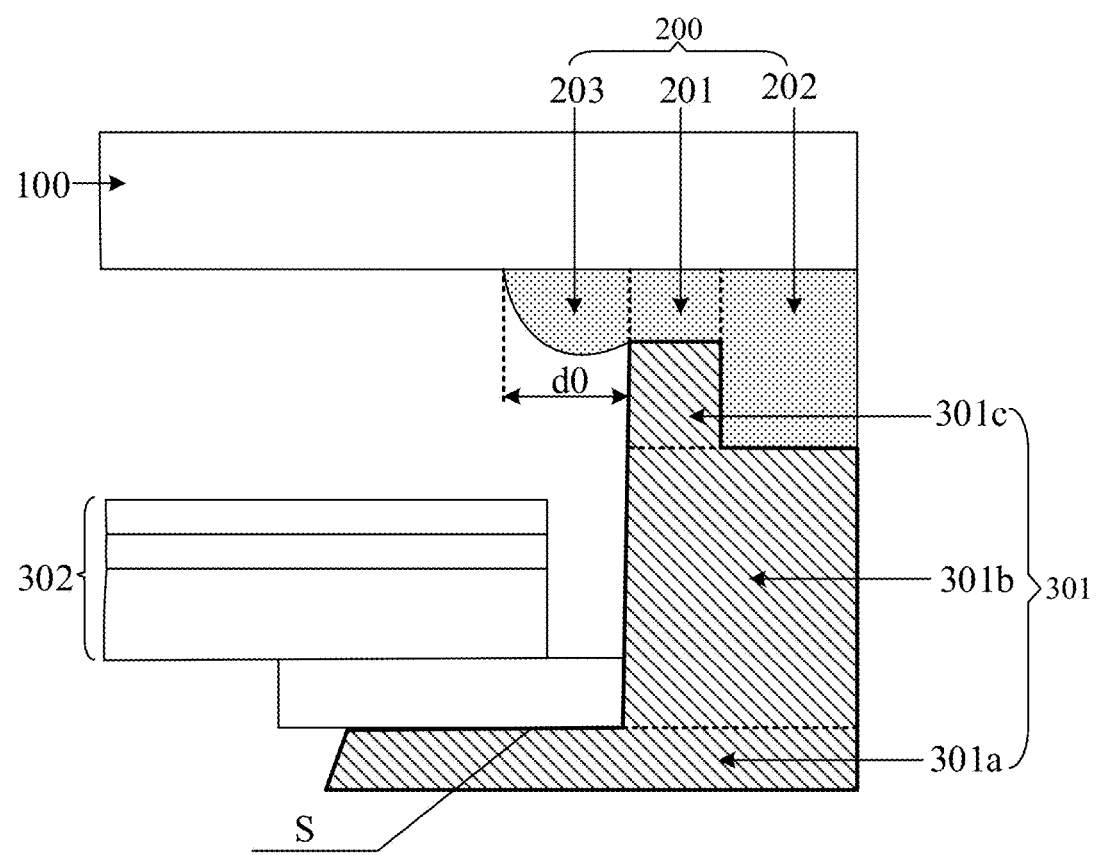
FIG. 5 is a partially enlarged diagram of the display module shown in FIG. 3 at a position of E.

In some embodiments of the present disclosure, referring to FIG. 3 and FIG. 5, FIG. 5 is a partially enlarged diagram of the display module shown in FIG. 3 at a position of E. The frame body 301 in the backlight module 300 includes a bearing stage 301a, a support stage 301b, and a barrier wall 301c.

The bearing stage 301a in the frame body 301 includes a bearing face S for bearing the optical film 302, the support stage 301b in the frame body 301 is affixed to the bearing face S, and the barrier wall 301c in the frame body 301 is affixed to a face, facing away from the bearing face S, of the support stage 301b.

The adhesive layer 200 includes a first adhesive portion 201 and a second adhesive portion 202. The first adhesive portion 201 is disposed between the barrier wall 301c in the frame body 301 and the display panel 100 and is bonded to the barrier wall 301c and the display panel 100, and the second adhesive portion 202 is disposed between the support stage 301b in the frame body 301 and the display panel 100 and is bonded to the support stage 301b and the display panel 100. The overflowed adhesive portion 203 in the adhesive layer 200 is disposed on a side, facing away from the second adhesive portion 202, of the first adhesive portion 201, and is bonded to the display panel 100.

The second adhesive portion 202 is closer to the edge of the display module 000 than the first adhesive portion 201 is. It should be noted that the edge of the display module 000 is a side edge of the display module 000. For example, in the case that the display module 000 is a rectangular display module, the display module 000 includes four side edges, and a shape enclosed by orthogonal projections of the four side edges on a plane of a light exiting face of the display panel 000 is a rectangle. Thus, the barrier wall 301c is disposed on a side, away from the edge of the display module 000, of the support stage 301b.

In the embodiments of the present disclosure, by disposing the barrier wall 301c on the side, facing away from the bearing face S, of the support stage 301b in the frame body 301, an amount of overflowed adhesive from the adhesive layer 200 to the display region of the display module 000 is reduced in bonding the display panel 100 and the frame body 301 by the adhesive layer 200, such that the maximum width d0 of the cross-section of the overflowed adhesive portion 203 subsequently formed in the adhesive layer 200 is less.

In summary, the display module in the embodiments of the present disclosure includes a display panel, an adhesive layer, and a backlight module. In a frame body of the backlight module, a side, facing away form a bearing face of a bearing stage, of a support stage is disposed with a barrier wall. In bonding the display panel and the frame body by the adhesive layer, an amount of overflowed adhesive from the adhesive layer to a display region of the display module is reduced by the barrier wall, such that a maximum width of a cross-section of an overflowed adhesive portion subsequently formed in the adhesive layer is less. For example, the maximum width of the cross-section of the overflowed adhesive portion in the adhesive layer is less than or equal to an overall width of two valid sub-pixels closest to an edge of the display region of the display panel. Thus, light irradiated to each pixel in light emitted from the backlight module is normally emitted from corresponding pixel. As such, a possibility of poor phenomenon of dark lines in an edge portion of a screen displayed by the display panel is efficiently reduced, and a display effect of the display panel is efficiently improved.

Figure 6:
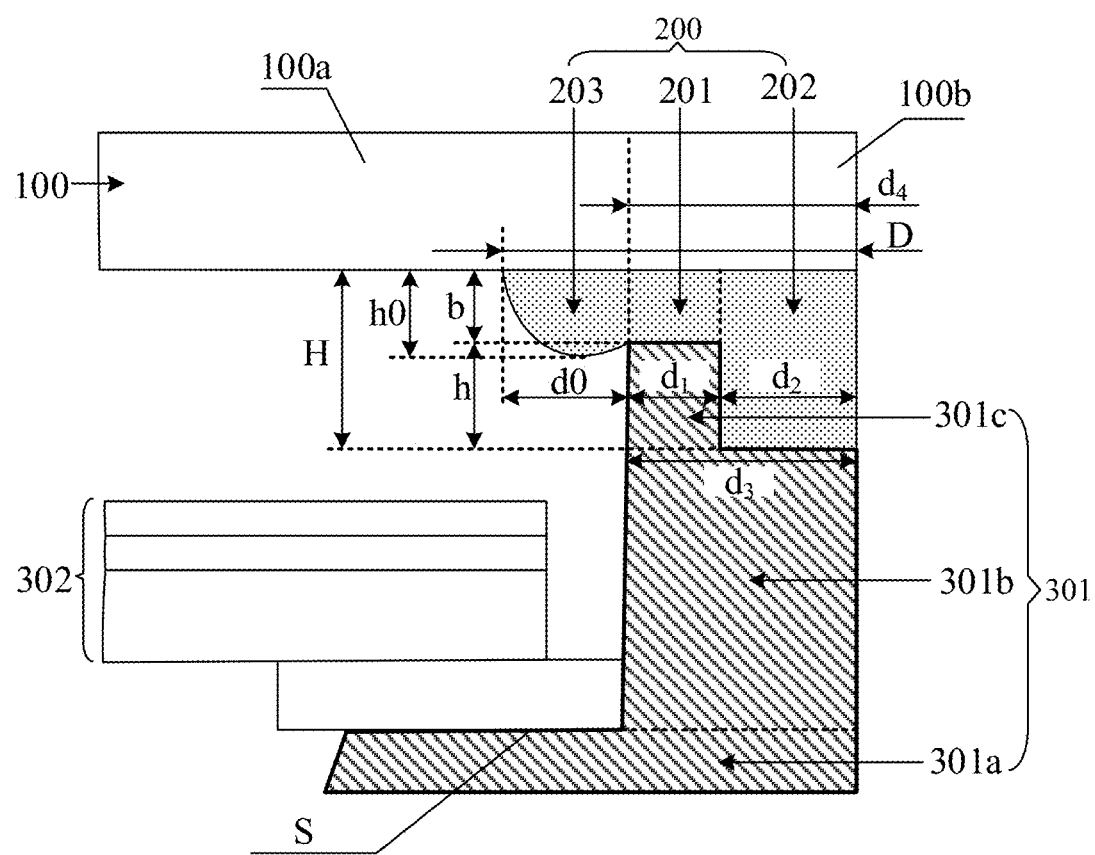
FIG. 6 is a partially enlarged diagram of another display module according to some embodiments of the present disclosure.

In the embodiments of the present disclosure, referring to FIG. 6, FIG. 6 is a partially enlarged diagram of another display module according to some embodiments of the present disclosure. A ratio of a minimum width $d_1$ of a cross-section of the barrier wall 301c in the frame body 301 to a minimum distance d2 between a face, close to the edge of the display module 000, of the barrier wall 301c and a face, close to the edge of the display module 000, of the support stage 301b is less than or equal to 1. That is, the minimum width $d_1$ of the cross-section of the barrier wall 301c and a width $d_3$ of a side, close to the barrier wall 301c, of a cross-section of the support stage 301b meet: $d_1 \le d_3/2$.

In some embodiments, in the case that both a face, away from the edge of the display module 000, of the barrier wall 301c in the frame body 301 and a face, away from the edge of the display module 000, of the support stage 301b in the frame body 301 are a plane, the face, away from the edge of the display module 000, of the barrier wall 301c in the frame body 301 is flush with the face, away from the edge of the display module 000, of the support stage 301b in the frame body 301. In this case, the minimum width $d_1$ of the cross-section of the barrier wall 301c and the width $d_3$ of the side, close to the barrier wall 301c, of the cross-section of the support stage 301b meet: $d_1, d_3/4$.

As such, the amount of overflowed adhesive from the adhesive layer 200 to the display region of the display module 000 is efficiently reduced by the barrier wall 301c, such that the width of the cross-section of the overflowed adhesive portion 203 subsequently formed by curing in the adhesive layer in a direction parallel to the optical film 302 is ensured to be less.

In the present disclosure, in a direction perpendicular to a plane of a light exiting face of the display panel 100, a minimum height h of the barrier wall 301c in the frame body 301 is less than a minimum distance H between the display panel 100 and the support stage 301b in the frame body 301. In some embodiments, in the direction perpendicular to the plane of the light exiting face of the display panel 100, the minimum height h of the barrier wall 301c and the minimum distance H between the support stage 301b and the display panel 100 meet: $H/4 \le h \le 3H/4$. As such, the first adhesive portion 201 in the adhesive layer 200 is disposed between the barrier wall 301c and the display panel 100, and the width of the cross-section of the first adhesive portion 201 in the adhesive layer 200 is equal to the minimum width $d_1$ of the cross-section, closest to the display panel 100, of the barrier wall 301c. Furthermore, as the second adhesive portion 202 in the adhesive layer 200 is disposed between the support stage 301b and the display panel 100, and the width of the cross-section of the second adhesive portion 202 is equal to the minimum distance d2 between the face, close to the edge of the display module 000, of the barrier wall 301c and the face, close to the edge of the display module 000, of the support stage 301b, the display panel 100 is bonded to the frame body 301 by the first adhesive portion 201 and the second adhesive portion 202, such that the display panel 100 is fixedly bonded to the frame body 301, and the assembly strength of the display panel 100 and the backlight module 300 upon assembling is further great.

In the embodiments of the present disclosure, in the direction perpendicular to the plane of the light exiting face of the display panel 100, the greater the minimum distance H between the support stage 301b and the display panel 100, the thicker the adhesive layer 200 required to be coated. In this case, in bonding the display panel 100 and the frame body 301 by the adhesive layer 200, the amount of overflowed adhesive from the adhesive layer 200 to the display region of the display module 000 is greater, and thus the maximum width d0 of the cross-section of the overflowed adhesive portion 203 subsequently formed in the adhesive layer is greater. In the direction perpendicular to the plane of the light exiting face of the display panel 100, the less the minimum distance H between the support stage 301b and the display panel 100, the thinner the adhesive layer 200 required to be coated. In this case, in bonding the display panel 100 and the frame body 301 by the adhesive layer 200, although the amount of overflowed adhesive from the adhesive layer 200 to the display region of the display module 000 is less, the adhesive force of the cured adhesive layer is not enough to affixed the display panel 100 to the frame body 301, such that the assembly strength of the display panel 100 and the backlight module 300 is less.

Thus, the minimum distance H between the support stage 301b and the display panel 100 is greater than or equal to 0.2 mm in the direction perpendicular to the plane of the light exiting face of the display panel, and/or, the minimum distance H between the support stage 301b and the display panel 100 is less than or equal to 0.5 mm in the direction perpendicular to the plane of the light exiting face of the display panel. That is, in the direction perpendicular to the plane of the light exiting face of the display panel, the minimum distance H between the support stage 301b and the display panel 100 ranges from 0.2 mm to 0.5 mm. As such, the thickness of the adhesive layer 200 required to be coated is not great and not less, such that the display panel 100 is fixedly bonded to the support stage 301b by the second adhesive portion 202 in the adhesive layer 200 on the premise that the maximum width of the cross-section of the overflowed adhesive portion 203 in the adhesive layer 200 is less, and the display panel is fixedly bonded to the frame body 301.

It should be noted that a maximum width (or a minimum height) of a cross-section of a structure in the above embodiments includes a width (or a height) in a case that the shape of the cross-section of the structure is irregular. It should be understood that in the case that the cross-section of the structure is regular, widths of the cross-section of the structure at positions are equal (or heights at position are equal), and the maximum width (or the minimum height) is the width (or the height) of the cross-section. For example, in the case that the cross-section of the barrier wall 301c is a rectangle, widths $d_1$ of the cross-section of the barrier wall 301c at different positions are equal, and heights h of the cross-section of the barrier wall 301c at different positions are also equal. Similarly, the minimum distance between two structures includes a distance in a case that surfaces of the structures is not planar. It should be understood that in the case that the distance between the structures are planar, distances between the two structures at different positions are equal, and the minimum distance is a distance between the two structures. For example, in the case that the face, close to the display panel, of the support stage 301b is a plane, and a face, close to the frame body 301, of the display panel 100 is a plane, distances H between the support stage 301b and the display panel 100 at different positions are equal.

In the embodiments of the present disclosure, a maximum width D of a cross-section of the adhesive layer 200 is greater than or equal to 1 mm. For example, in the case that the cross-section of the barrier wall 301c is a rectangle, and the face, close to the display panel, of the support stage 301b is parallel to the plane of the light exiting face of the display panel 100, the maximum width D of the cross-section of the adhesive layer 200 is equal to a sum of a width of the first adhesive portion 201, a width of the second adhesive portion 202 (that is, a distance between the face, close to the edge of the display module 000, of the barrier wall 301c and the face, close to the edge of the display module 000, of the support stage 301b), and the maximum width of the cross-section of the overflowed adhesive portion 203. As such, the bonding affixation between the display panel 100 and the frame body 301 is further improved. It should be noted that the overflowed adhesive portion 203 in the adhesive layer can also improve the bonding affixation between the display panel 100 and the frame body 301.

In the present disclosure, in the direction parallel to the optical film 302, the maximum width d0 of the cross-section of the overflowed adhesive portion 203 in the adhesive layer 200 is less than or equal to the overall width of two valid sub-pixels 100c closest to the edge of the display region 100a. Thus, in bonding the display panel 100 and the frame body 301 by the adhesive layer 200, the overflowed adhesive stops in the case that the amount of overflowed adhesive from the adhesive layer 200 to the display region of the display module 000 reaches the first row of pixels close to the non-display region 01b, such that the light emitted from the back light module 300 to the pixels is normally exited from the corresponding pixels.

In the embodiments of the present disclosure, as the barrier wall 301c in the frame body 301 can reduce the amount of overflowed adhesive of the adhesive layer 200 in bonding the display panel 100 and the frame body 301, the width of the overflowed adhesive portion 203 is less, and the maximum thickness of the overflowed adhesive portion 203 is less. Illustratively, in the direction perpendicular to the plane of the light exiting face of the display panel 100, a maximum thickness h0 of the overflowed adhesive portion 203 in the adhesive layer 200 is less than or equal to twice a minimum distance b between the barrier wall 301c and the display panel 100. Illustratively, in the direction perpendicular to the plane of the light exiting face of the display panel 100, the maximum thickness h0 of the overflowed adhesive portion 203 in the adhesive layer 200 is less than or equal to 1.6 times of the minimum distance b between the barrier wall 301c and the display panel 100. As such, the refraction of the light by the overflowed adhesive portion 203 is poor, such that the light emitted from the backlight module 300 to the first row of pixels close to the non-display region 01b is also normally exited from the row of pixels.

In some embodiments, a shear resistance strength P of the adhesive layer 200 meets:

$$P \geq \frac{m \times g}{12 \times s};$$

m represents a mass of the display panel 100, g represents gravitational acceleration, and s represents an area of a cross-section of the adhesive layer 200. It should be noted that the constant 12 in the above formula is a coefficient related to a material of the adhesive layer 200.

In the present disclosure, in the case that the shear resistance strength P of the adhesive layer 200 meets the above condition, the adhesive layer 200 is not prone to the poor phenomenon of breaking, such that the display panel 100 and the backlight module 300 are fixedly bonded by the adhesive layer 200.

In some embodiments, in the case that the mass of the display panel 100 is 2.5 kg, and the area of the cross-section of the adhesive layer 200 is 0.4 mm2, the shear resistance strength P of the adhesive layer 200 is greater than or equal to 5.1 MPa.

In the embodiments of the present disclosure, an area S1' of the cross-section of the overflowed adhesive portion 203 in the adhesive layer 200 and an area S2 of a cross-section of the barrier wall 301c meet:

$$\frac{\pi \times \left(\frac{H}{0.625}\right)^2}{4} - S1' \leq S2';$$

H represents a minimum distance between the support stage 301b and the display panel 100.

It should be noted that in the case that the barrier wall 301c is not disposed in the frame body 301, the area S0 of the cross-section of the overflowed adhesive portion in the adhesive layer is about:

$$S0 = \frac{\pi \times \left(\frac{H}{0.625}\right)^2}{4};$$

Thus, in the case that the barrier wall 301c is disposed in the frame body 301, a difference value between the area S0 of the cross-section of the overflowed adhesive portion without the barrier wall and the area S1' of the cross-section of the overflowed adhesive portion with the barrier wall is less than or equal to the area S2 of the cross-section of the barrier wall 301c.

Figure 7:
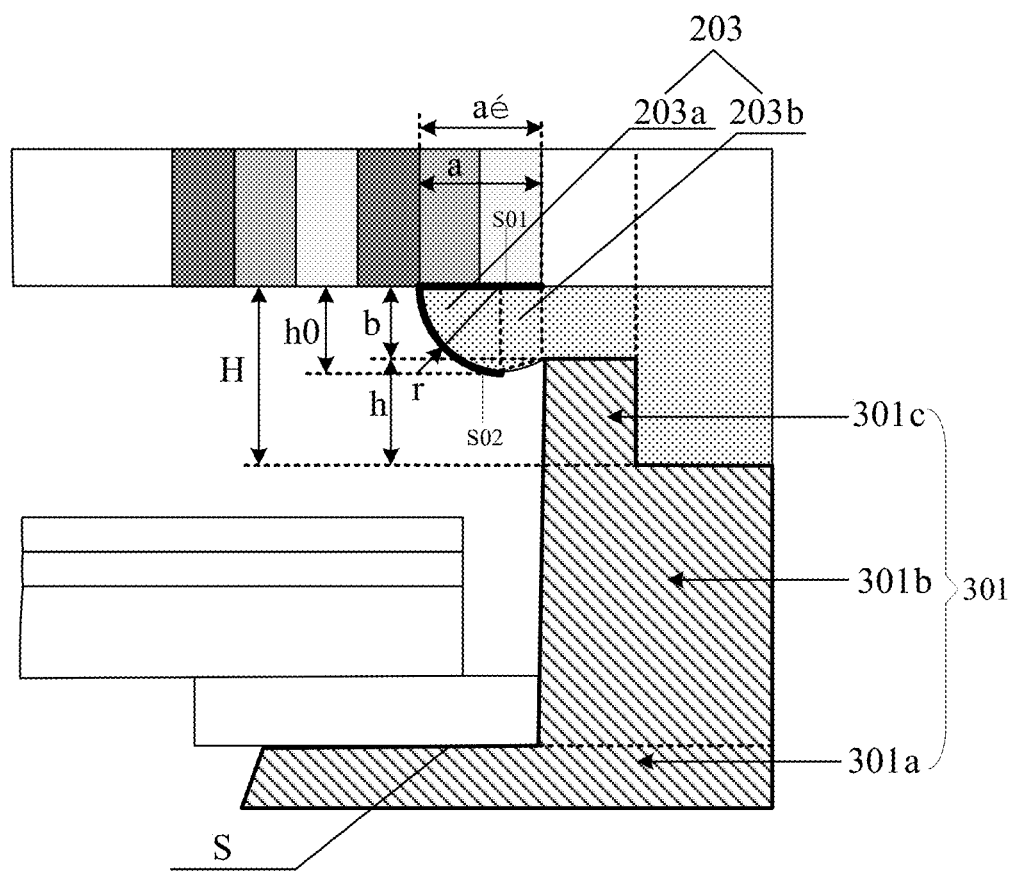
FIG. 7 is a partially enlarged diagram of another display module according to some embodiments of the present disclosure.

In the present disclosure, for convenience of calculation of the above area S1' of the cross-section of the overflowed adhesive portion, the shape of the overflowed adhesive portion 203 requires to be analyzed. Referring to FIG. 7, FIG. 7 is a partially enlarged diagram of another display module according to some embodiments of the present disclosure. The cross-section of the overflowed adhesive portion 203 in the adhesive layer 200 includes an adhesive face S01 and an arc-shaped face S02. The adhesive face S01 is bonded to the display panel 100, the arc-shaped face S02 is disposed on a side, facing away from the display panel 100, of the adhesive face S01, and a maximum distance between the arc-shaped face S02 and the display panel 100 is less than or equal to the maximum distance between the support stage 301b and the display panel 100. The maximum distance between the arc-shaped face S02 and the display panel 100 is a maximum thickness h0 of the overflowed adhesive portion 203 in the adhesive layer 200 in the direction perpendicular to the plane of the light exiting face of the display panel 100.

In some embodiments, the shape of the cross-section of the overflowed adhesive portion 203 in the adhesive layer 200 is approximately composed by a fan 203a and a trapezoid 203b. The arc-shaped face S02 is an arc-shaped face of the fan 203a, and the adhesive face S01 is a face, close to the display panel 100, of the fan 203a and a face, close to the display panel 100, of the trapezoid 203b. A fan-shaped radius angle of the fan 203a is about 90°, and a radius r of the fan 203a is equal to a maximum thickness of the overflowed adhesive portion 203. Thus, the radius r of the fan 203a is related to the minimum distance b between the barrier wall 301c and the display panel 100. In some embodiments, the radius r of the fan 203a is less than or equal to 1.6 times of the minimum distance b between the barrier wall 301c and the display panel 100. A length of an upper base of the trapezoid 203b is approximately equal to the distance b between the barrier wall 301c and the display panel 100, and a length of a lower base of the trapezoid 203b is approximately equal to the radius r of the fan 203a, and a height of the trapezoid 203b is related to the width of the valid sub-pixel 100c and the radius r of the fan 203a. In some embodiments, as the maximum width d0 of the overflowed adhesive portion 203 in the adhesive layer 200 requires to be less than or equal to the overall width of two valid sub-pixels 100c closest to the edge of the display region 100a, the height of the trapezoid 203b is approximately equal to a difference value between the overall width a of two valid sub-pixels 100c closest to the edge of the display region 100a and the radius r of the fan 203a. Thus, a maximum valid area S1 of the cross-section of the overflowed adhesive portion 203 is approximately calculated based on the above relationships. The maximum valid area S1 of the cross-section of the overflowed adhesive portion 203 is an equivalent area of the overflowed adhesive portion 203 in the case that the maximum width of the cross-section of the overflowed adhesive portion 203 is equal to the overall width of two valid sub-pixels 100c closest to the edge of the display region 100a.

Thus, the barrier wall 301c meets the following conditions:

$$\begin{cases} S1 = \dfrac{\pi r^2}{4} + \dfrac{1}{2} \times (b+r) \times (a-r) \\ r = h0 \\ S2 = d_1 \times h \\ \dfrac{\pi \times \left(\dfrac{H}{0.625}\right)^2}{4} - S1 \leq S2 \end{cases} ;$$

H represents a minimum distance between the support stage 301b and the display panel 100, $d_1$ represents a minimum width of the cross-section of the barrier wall 301c, h represents a minimum height of the barrier wall 301c in a direction perpendicular to a plane of a light exiting face of the display panel 100, r represents a radius of the arc-shaped face of the cross-section of the overflowed adhesive portion 203, h0 represents a maximum thickness of the overflowed adhesive portion 203, b represents a minimum distance between the barrier wall 301c and the display panel 100, a represents the overall width of two valid sub-pixels closest to the edge of the display region 100a, and S2 represents a valid area of the cross-section of the barrier wall 301c.

As such, a size of the barrier wall 301c is predetermined prior to bonding the display panel 100 and the frame body 301 by the adhesive layer 200, the area of the cross-section of the overflowed adhesive portion 203 in the adhesive layer 200 is predicted upon bonding of the display panel 100 and the support stage 301b by the adhesive layer 200, and thus whether the size of the overflowed adhesive portion 203 meets the design requirements is determined.

It should be noted that the embodiments of the present disclosure are illustrated by taking the shape of the cross-section of the barrier wall 301c being the rectangle as an example. In some embodiments, the shape of the cross-section of the barrier wall 301c is a regular shape, such as a trapezoid or semicircle, or other irregular shapes, which is not limited in the embodiments of the present disclosure as long as the area of the cross-section of the barrier wall 301c meets the above conditions.

In some embodiments, the barrier wall 301c meets the following conditions:

$$\begin{cases} S1 = \dfrac{\pi r^2}{4} + \dfrac{1}{2} \times (b+r) \times (a'-r) \\ r = h0 \\ S2 = d_1 \times h \\ \dfrac{\pi \times \left(\dfrac{H}{0.625}\right)^2}{4} - S1 \leq S2 \end{cases} ;$$

H represents a minimum distance between the support stage 301b and the display panel 100, $d_1$ represents a minimum width of a cross-section of the barrier wall 301c, h represents a minimum height of the barrier wall 301c in a direction perpendicular to a plane of a light exiting face of the display panel 100, r represents a radius of the arc-shaped face of the cross-section of the overflowed adhesive portion 203, h0 represents a maximum thickness of the overflowed adhesive portion 203, b represents a minimum distance between the barrier wall 301c and the display panel 100, a' represents a distance between an orthogonal projection of an edge, away from the edge of the display region 100a, of a second valid sub-pixel closest to the edge of the display region 100a of the display panel 100 on the display panel and an orthogonal projection of the barrier wall 301c on the display panel 100, and S2 represents a valid area of the cross-section of the barrier wall 301c.

It should be noted that the embodiments of the present disclosure are illustrated by taking one barrier wall 301c being disposed on the support stage 301b as an example. In some embodiments, there may be a plurality of barrier walls 301c, which is not limited in the embodiments of the present disclosure as long as a sum of the areas of the cross-section of the barrier walls 301c on the support stage 301b meets the above conditions.

Figure 8:
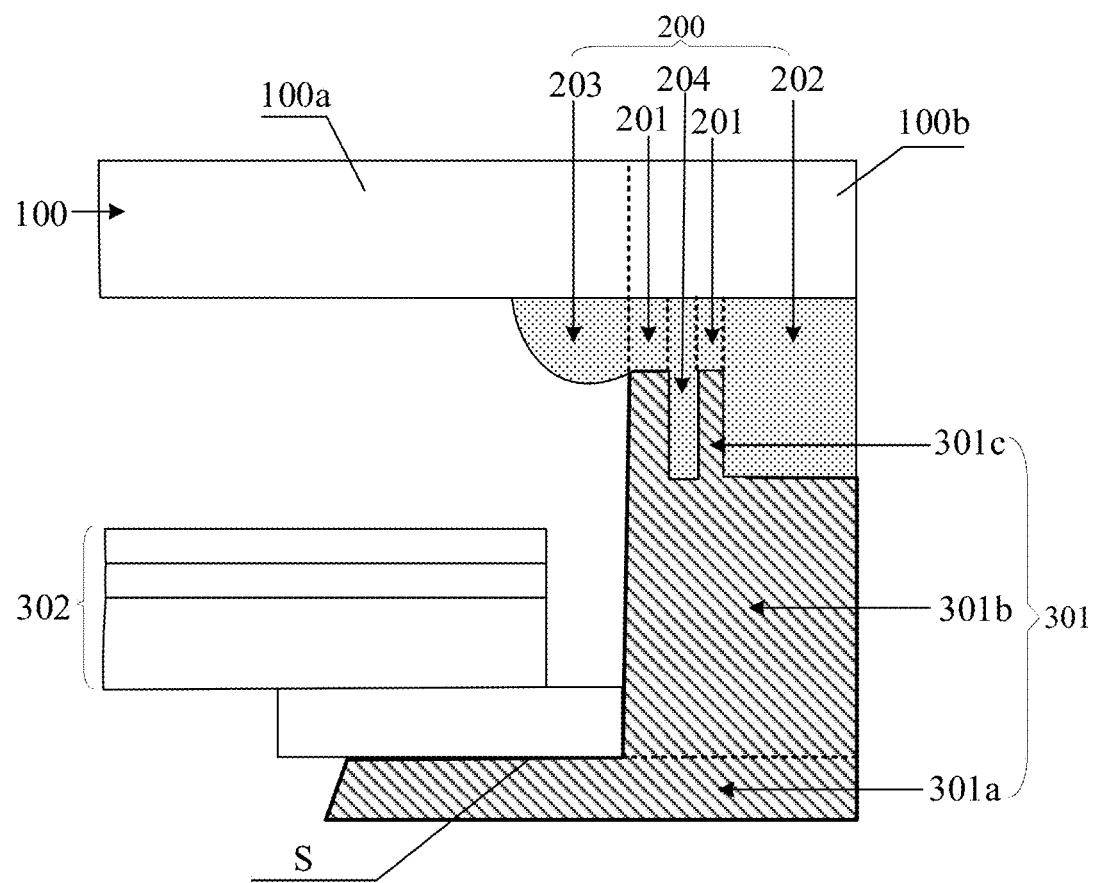
FIG. 8 is a partially enlarged diagram of another display module according to some embodiments of the present disclosure.

Illustratively, referring to FIG. 8, FIG. 8 is a partially enlarged diagram of another display module according to some embodiments of the present disclosure. At least two barrier walls 301c are juxtaposed on a face, facing away from the bearing face S, of the support stage 301b in the frame body 301, and the barrier walls 301c are parallel. A gap is defined between any two adjacent barrier walls 301c, and the adhesive layer further includes an auxiliary adhesive portion 204 in the gap. As such, the affixation in bonding the display panel 100 and the frame body 301 is further improved by the auxiliary adhesive portion 204 in the gap in the adhesive layer 200.

It should be noted that in the case that at least two barrier walls 301c are juxtaposed on a face, facing away from the bearing face S, of the support stage 301b in the frame body 301, in the direction perpendicular to the plane of the light exiting face of the display panel 100, the minimum height of the barrier wall 301c is equal to a minimum height h of the barrier wall 301c in the above embodiments, and a sum of widths of the cross-sections of the barrier walls 301c and the minimum width $d_1$ of the cross-section of the barrier wall 301c in the above embodiments.

In some embodiments, as shown in FIG. 6, the side face of the display panel 100 is flush with a face of the edge, close to the display module 000, of the frame body 301, or is protruded from the frame body 301. In some embodiments, an orthogonal projection of the support stage 301b on the display panel 100 is within the non-display region 100b of the display panel. In some embodiments, a width $d_3$ of a side, close to the barrier wall 301c, of the cross-section of the support stage 301b is less than or equal to a width d4 of the non-display region 100b. In some embodiments, in the case that a face, away from the edge of the display module 100, of the support stage 301b is a plane, a boundary of the display region 100a is flush with the face, away from the edge of the display module 100, of the support stage 301b. As such, the frame body 301 does not block the display region 100a of the display panel 100, such that the display panel 100 normally displays the screen, and the width of the frame of the display module 000 is ensured to be less. It should be noted that being flush of two planes is that the two planes are flushed. While an assembling error exists in practical application, and thus the two planes are not flushed. Thus, one plane is shifted ±0.2 mm relative to the other plane.

In the embodiments of the present disclosure, the display module 000 further includes a plurality of barrier walls 301c extending along an edge of the display module 000. The plurality of barrier walls 301c are disposed on a plurality of side faces of the display module, and orthogonal projections of the plurality of barrier walls 301c on the display panel 100 surround the display region 100a.

In some embodiments, the orthogonal projections of the plurality of barrier walls 301c on the display panel 100 surround at least two sides of the display region 100a. In some embodiments, in the case that two barrier walls 301c are defined, the orthogonal projections of the two barrier walls on the display panel 100 surround two opposite sides or two adjacent sides of the display region 100a. In the case that three barrier walls 301c are defined, the orthogonal projections of the three barrier walls on the display panel 100 surround three sides of the display region 100a. In the case that four barrier walls 301c are defined, the orthogonal projections of the four barrier walls on the display panel 100 surround four sides of the display region 100a, and in this case, the orthogonal projections of the four barrier walls 301c on the display panel 100 surround the display region 100a.

Thus, the form of the barrier walls 301c in the frame body 301 is achieved in many implementations, and the embodiments of the present disclosure are illustrated in the two possible implementations.

Figure 9:
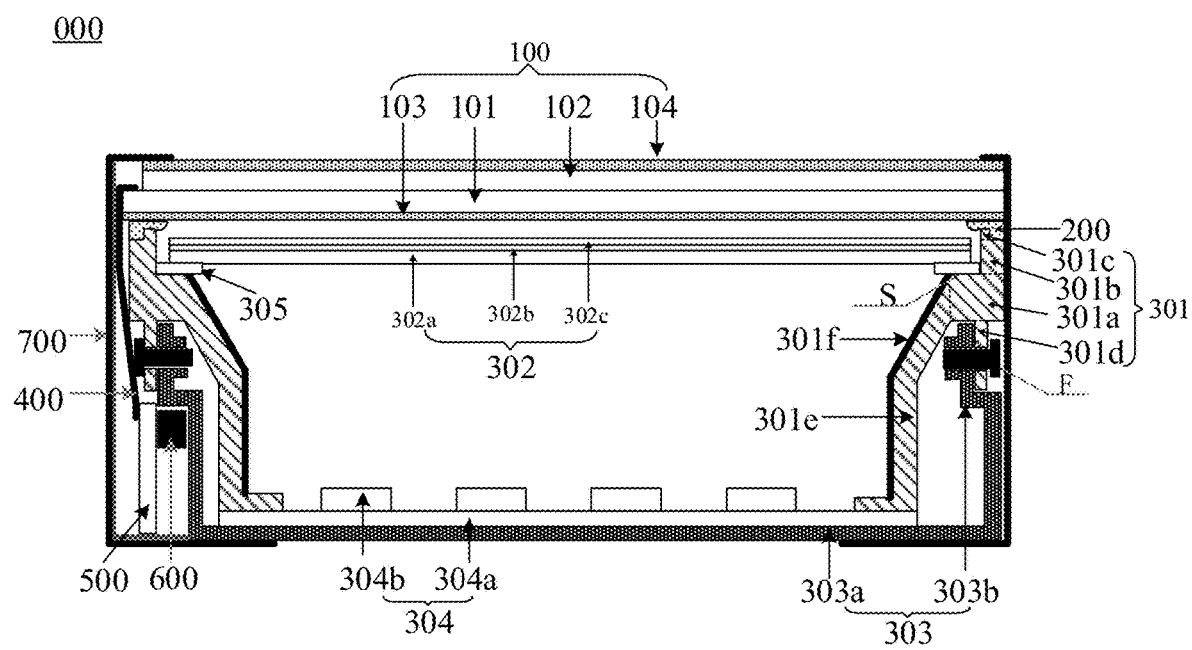
FIG. 9 is a schematic structural diagram of another display module according to some embodiments of the present disclosure.

In a first possible implementation, as shown in FIG. 9, FIG. 9 is a schematic structural diagram of another display module according to some embodiments of the present disclosure. The display module 000 includes a plurality of barrier walls 301c extending along an edge of the display module 000. The plurality of barrier walls 301c are disposed on sides of the display module 000, that is, orthogonal projections of the plurality of barrier walls 301c on the display panel 100 surround the display region of the display panel 100. In some embodiments, the barrier wall 301c in the frame body 301 is annular, and the orthogonal projection of the barrier wall 301c surrounds the display region 100a of the display panel 100. As such, the barrier wall 301c is disposed at any position of the frame body 301, such that the width of the overflowed adhesive portion 203 at any position of the adhesive layer 200 is less.

Figure 10:
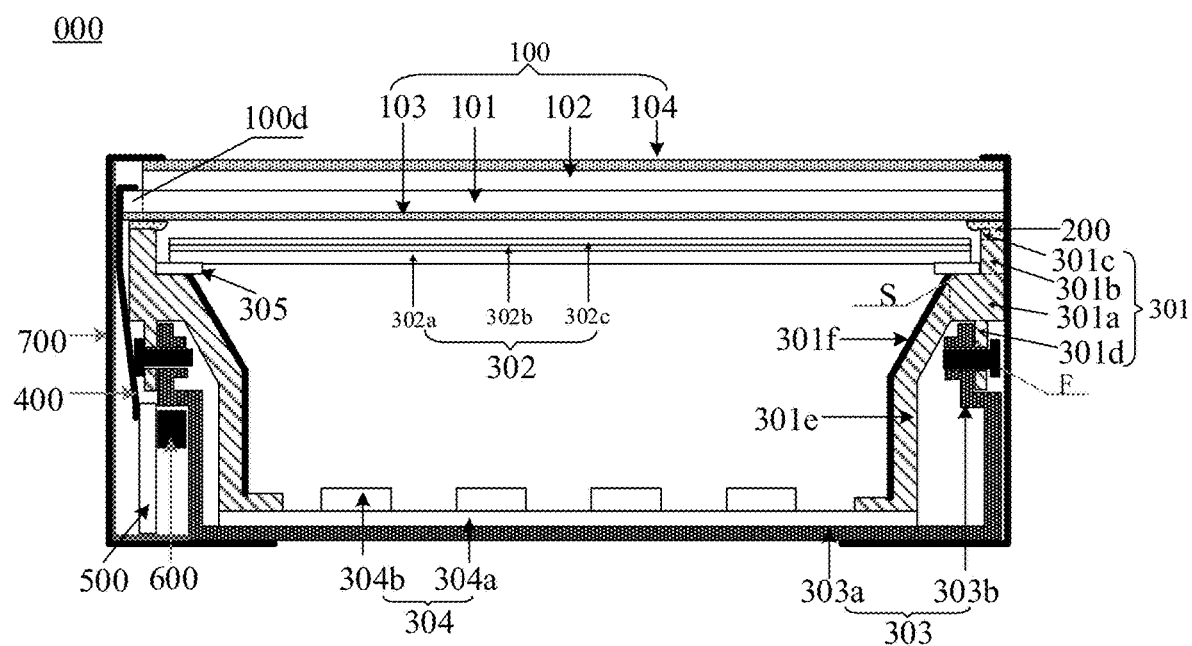
FIG. 10 is a schematic structural diagram of another display module according to some embodiments of the present disclosure.

In a second possible implementation, as shown in FIG. 10, FIG. 10 is a schematic structural diagram of another display module according to some embodiments of the present disclosure. The non-display region 100b of the display panel 100 includes a bonding region 100d. In some embodiments, the display panel 100 includes an array substrate 101 and a color film substrate 102 that are opposite, at least one side of the array substrate 101 protrudes from the color film substrate 102, and a portion, protruding from the color film substrate 102, of the array substrate 101 is a portion of the bonding region 100d. In the present disclosure, the bonding region 100d is disposed on a first side of the display region 100a, and the orthogonal projections of the plurality of barrier walls 301c in the frame body 301 on the display panel 100 are on other sides of the display region 100a than the first side.

In this case, as a width of the side, provided with the bonding region 100d, of the non-display region 100b of the display panel 100 is great, the amount of the overflowed adhesive of the adhesive layer 200 on the side is ensured to be less even if the side is not provided with the barrier wall 301c, and thus the overflowed adhesive portion on the side does not affect the normal display of the display panel 100. In addition, as widths of other sides, not disposed with the bonding region 100d, of the non-display region 100b of the display panel 100 are less, the barrier wall 301c requires to be disposed on the other sides, and the less amount of the overflowed adhesive of the adhesive layer 200 on the other sides ensures the overflowed adhesive portion on the other sides does not affect the normal display of the display panel 100.

In the embodiments of the present disclosure, as shown in FIG. 9 and FIG. 10, the backlight module 300 in the display module 000 further includes: a backplane 303. The backplane 303 is disposed on a side, facing away from the display panel 100, of the optical film 302, the backplane 303 is fixedly connected to the frame body 301, and the backlight source 304 is disposed between the backplane 303 and the optical film 302. The backlight source 304 is disposed on the backplane 303, and is also referred to as a light plate.

In some embodiments, the frame body 301 further includes a connecting portion 301d fixedly connected to a side, facing away from the support stage 301b, of the bearing stage 301a. The backplane 303 includes a backplane body 303a configured to support the backplane of the backlight source 304 and a connection portion 303b fixedly connected to an edge of the backplane body 303a. The connecting portion 301d in the frame body 301 is fixedly connected to the connection portion 303b in the backplane 303 by a screw F, such that the frame body is fixedly connected to the backplane 303.

In the present disclosure, the backlight source 304 includes a circuit board 304a on a side, close to the optical film 302, of the backplane body 303a and a plurality of light-emitting elements 304b that are arranged in an array, disposed on a side, facing away from the backplane body 303a, of the circuit board 304a, and electrically connected to the circuit board 304a. The light-emitting element 304b is a light-emitting diode (LED).

In some embodiments, the frame body 301 in the backlight module 300 further includes a surrounding structure 301e fixedly connected to the bearing stage 301a. The surrounding structure 301e surrounds an edge of the backlight source 304, and a side, close to the backlight source 304, of the surrounding structure 301e is provided with a reflective layer 301f. An end, close to the backplane body 303a, of the surrounding structure 301e limits the edge portion of the circuit board 304a in the backlight source 304.

In the present disclosure, light emitted from the backlight source 304 to the surrounding structure 301e is reflected by the reflective layer 301f, such that the light is irradiated to the display panel 100 upon passing through the optical film 302.

In the embodiments of the present disclosure, the backlight module 300 further includes a light guide structure 305 on the bearing face S of the bearing stage 301a. The support stage 301b in the frame body 301 is closer to the edge of the display module than the light guide structure 305 is, and the optical film 302 in the backlight module 300 is disposed on a side, facing away from the bearing face S, of the light guide structure 305. The light guide structure 305 is annular. In this case, light emitted from the backlight source 304 to the edge of the display module 000 is guided by the light guide structure 305, such that the light guided by the light guide structure 305 passes through the optical film 302 and is emitted to pixels arranged in the edge of the display panel 100, and thus light is normally exited from the edge of the display region 100a of the display panel 100.

In some embodiments, the optical film 302 in the backlight module 300 includes at least one of a diffuse plate 302a, a lower prism sheet 302b, and an upper prism sheet 302c. In some embodiments, the diffuse plate 302a, the lower prism sheet 302b, and the upper prism sheet 302c are laminated in a direction away from the bearing face S.

In the present disclosure, the display panel 100 in the display module 000 further includes a first polarizer 103 on a side, facing away from the color film substrate 102, of the array substrate 101 and a second polarizer 104 on a side, facing away from the array substrate 101, of the color film substrate 102. A polarization direction of the first polarizer 103 is perpendicular to a polarization direction of the second polarizer 104.

In some embodiments, the display module 000 further includes a chip on flex (COF) 400 bonded with the array substrate 101 and a printed circuit board (PCB) 500 electrically connected to a side, facing away from the array substrate 101, of the COF 400. A buffer layer 600 is disposed between the PCB 500 and the connection portion 303b in the backplane 303, and the PCB 500 is buffered by the buffer layer 600 to avoid damage of PCB 400 upon a force on the display module 000.

In the embodiments of the present disclosure, the display module 000 further includes an auxiliary adhesive layer 700 wrapped in an edge region of the display panel 100 and an edge region of the backlight module 300. The affixation in assembling the display panel 100 and the backlight module 300 is improved by the auxiliary adhesive layer 700.

In summary, the display module in the embodiments of the present disclosure includes a display panel, an adhesive layer, and a backlight module. In a frame body of the backlight module, a side, facing away form a bearing face of a bearing stage, of a support stage is disposed with a barrier wall. In bonding the display panel and the frame body by the adhesive layer, an amount of overflowed adhesive from the adhesive layer to a display region of the display module is reduced by the barrier wall, such that a maximum width of a cross-section of an overflowed adhesive portion subsequently formed in the adhesive layer is less. For example, the maximum width of the cross-section of the overflowed adhesive portion in the adhesive layer is less than or equal to an overall width of two valid sub-pixels closest to an edge of the display region of the display panel. Thus, light irradiated to each pixel in light emitted from the backlight module is normally emitted from corresponding pixel. As such, a possibility of poor phenomenon of dark lines in an edge portion of a screen displayed by the display panel is efficiently reduced, and a display effect of the display panel is efficiently improved.

Figure 11:
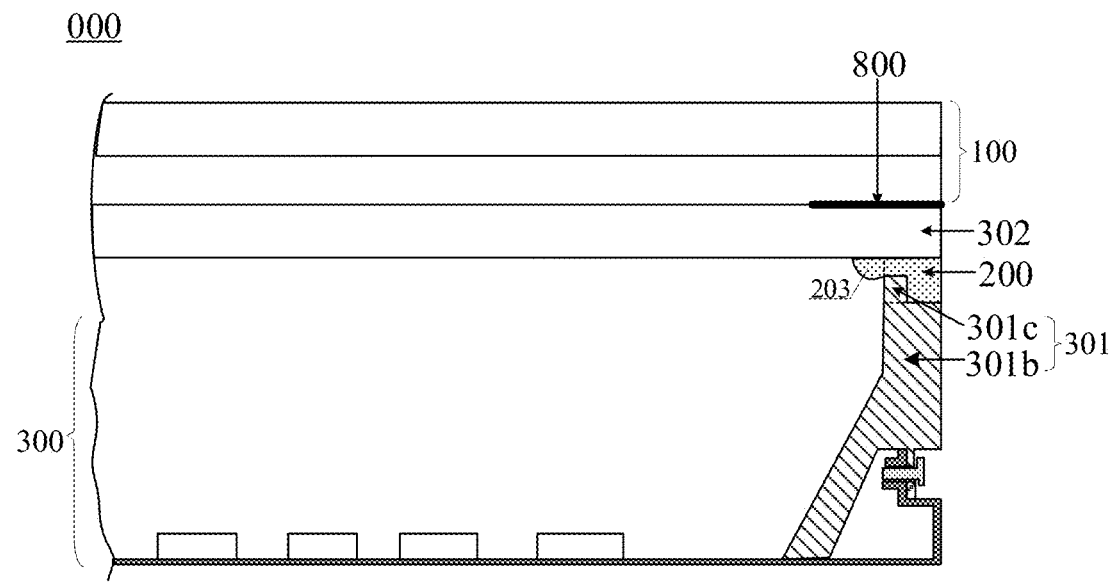
FIG. 11 is a schematic structural diagram of another display module according to some embodiments of the present disclosure.

The embodiments of the present disclosure further provide another display module. As shown in FIG. 11, FIG. 11 is a schematic structural diagram of another display module according to some embodiments of the present disclosure. The display module 000 includes a display panel 100, an optical film 302, a frame body 301, and an adhesive layer 200.

The optical film 302 in the display module 000 is attached to a light entering face (that is, a face opposite to a display face) of the display panel 100. The display panel 100 is bonded to the optical film 302 by an optical adhesive layer 800. For example, the optical film 302 homogenize the backlight.

The frame body 301 in the display module 000 is disposed on a side, facing away from the display panel 100, of the optical film. The frame body 301 includes a support stage 301b and a barrier wall 301c on a face, close to the optical film 302, of the support stage 301b.

An outer side face of the support stage 301b is protruded from an outer side face of the barrier wall 301c, and a width of the barrier wall 301c is less than a width of the support stage 301b. It should be noted that the support stage 301b in the frame body 301 in the display module 000 is generally annular, and thus the outer side face of the support stage 301b is a face, facing away from the annular region enclosed by the support stage 301b, of the support stage 301b, and the outer side face of the barrier wall 301c and the outer side face of the support stage 301b are disposed on the same side. It should be further noted that the frame body 301 and the optical film 302 in the display module 000 are configured to form the backlight module 300 in the display module 000.

The adhesive layer 200 in the display module 000 includes a first adhesive portion 201 and a second adhesive portion 202. The first adhesive portion 201 is disposed between the barrier wall 301c in the frame body 301 and the display panel 100 and is bonded to the barrier wall 301c and the display panel 100, and the second adhesive portion 202 is disposed between the support stage 301b in the frame body 301 and the display panel 100 and is bonded to the support stage 301b and the display panel 100. The adhesive layer 200 further includes an overflowed adhesive portion 203 on a side, facing away from the second adhesive portion 202, of the first adhesive portion 201, and the overflowed adhesive portion 203 in the adhesive layer 200 is bonded to the display panel 100. The second adhesive portion 202 is closer to the edge of the display module 000 than the first adhesive portion 201 is.

In some embodiments, a minimum width $d_1$ of a cross-section of the barrier wall and a width $d_3$ of a side, close to the barrier wall, of a cross-section of the support stage meet: $d_1 \leq d_3/2$.

In some embodiments, a face, close to the optical film, of the barrier wall is flush with a face, close to the optical film, of the support stage.

In some embodiments, the minimum width $d_1$ of the cross-section of the barrier wall and the width $d_3$ of the side, close to the barrier wall, of the cross-section of the support stage meet: $d_1 \geq d_3/4$.

In some embodiments, in a direction perpendicular to a plane of a light exiting face of the display panel, a minimum height h of the barrier wall and a minimum distance H between the support stage and the display panel meet: $H/4 \leq h \leq 3H/4$.

In some embodiments, in a direction perpendicular to a plane of a light exiting face of the display panel, a minimum distance between the display panel and the support stage is greater than or equal to 0.2 mm; and/or, in the direction perpendicular to the plane of the light exiting face of the display panel, the minimum distance between the display panel and the support stage is less than or equal to 0.5 mm.

In some embodiments, a maximum width of a cross-section of the adhesive layer is greater than or equal to 1 mm.

In some embodiments, the adhesive layer further includes: an overflowed adhesive portion on a side, facing away from the second adhesive portion, of the first adhesive portion, wherein the overflowed adhesive portion is bonded to the display panel; and the display panel includes a plurality of valid sub-pixels arranged in an array, and a maximum width of a cross-section of the overflowed adhesive portion is less than or equal to an overall width of two valid sub-pixels closest to an edge of a display region of the display panel.

In some embodiments, in a direction perpendicular to a plane of a light exiting face of the display panel, a maximum thickness of the overflowed adhesive portion is less than or equal to twice a minimum distance between the display panel and the barrier wall.

In some embodiments, the cross-section of the overflowed adhesive portion includes: an adhesive face and an arc-shaped face, wherein the adhesive face is bonded to the display panel, the arc-shaped face is disposed on a side, facing away from the display panel, of the adhesive face, and a maximum distance between the arc-shaped face and the display panel is less than or equal to a maximum distance between the support stage and the display panel.

In some embodiments, an area S1' of the cross-section of the overflowed adhesive portion and an area S2 of a cross-section of the barrier wall meet:

$$\frac{\pi \times \left(\frac{H}{0.625}\right)^2}{4} - S1' \leq S2;$$

H represents a minimum distance between the support stage and the display panel.

In some embodiments, relevant dimensions of the barrier wall meet:

$$\begin{cases} S1 = \frac{\pi r^2}{4} + \frac{1}{2} \times (b+r) \times (a-r) \\ r = h0 \\ S2 = d_1 \times h \\ \frac{\pi \times \left(\frac{H}{0.625}\right)^2}{4} - S1 \leq S2 \end{cases};$$

H represents a minimum distance between the support stage and the display panel, $d_1$ represents a minimum width of a cross-section of the barrier wall, h represents a minimum height of the barrier wall in a direction perpendicular to a plane of a light exiting face of the display panel, r represents a radius of the arc-shaped face, h0 represents a maximum thickness of the overflowed adhesive portion, b represents a minimum distance between the barrier wall and the display panel, and a represents the overall width of two valid sub-pixels closest to the edge of the display region.

In some embodiments, relevant dimensions of the barrier wall meet:

$$\begin{cases} S1 = \frac{\pi r^2}{4} + \frac{1}{2} \times (b+r) \times (a'-r) \\ r = h0 \\ S2 = d_1 \times h \\ \frac{\pi \times \left(\frac{H}{0.625}\right)^2}{4} - S1 \leq S2 \end{cases};$$

H represents a minimum distance between the support stage and the display panel, $d_1$ represents a minimum width of a cross-section of the barrier wall, h represents a minimum height of the barrier wall in a direction perpendicular to a plane of a light exiting face of the display panel, r represents a radius of the arc-shaped face, h0 represents a maximum thickness of the overflowed adhesive portion, b represents a minimum distance between the barrier wall and the display panel, and a' represents a distance between an orthogonal projection of an edge, away from the edge of the display region, of a second valid sub-pixel closest to the edge of the display region of the display panel on the display panel and an orthogonal projection of the barrier wall on the display panel.

In some embodiments, a shear resistance strength P of the adhesive layer meets:

$$P \geq \frac{m \times g}{12 \times s};$$

m represents a mass of the display panel, g represents gravitational acceleration, and s represents a minimum area of a cross-section of the adhesive layer.

In some embodiments, the adhesive layer is formed by curing an optical adhesive.

In some embodiments, at least two barrier walls are juxtaposed on a face, facing away from the bearing face, of the support stage, a gap is defined between any two adjacent barrier walls, and the adhesive layer further includes an auxiliary adhesive portion in the gap.

In some embodiments, the display panel further includes a display region and a non-display region on a periphery of the display region, and a width of a side, close to the barrier wall, of a cross-section of the support stage is less than or equal to a width of the non-display region.

In some embodiments, a boundary of the display region is flush with a face, close to the optical film, of the support stage.

In some embodiments, the display module further includes: a plurality of barrier walls extending along an edge of the display module, wherein the plurality of barrier walls are disposed on a plurality of side faces of the display module, and orthogonal projections of the plurality of barrier walls on the display panel surround the display region of the display panel.

In some embodiments, the non-display region includes a bonding region, wherein the bonding region is disposed on a first side of the display region, and the orthogonal projections of the plurality of barrier walls on the display panel are on other sides of the display region than the first side.

In some embodiments, the backlight module further includes: a light guide structure on the bearing face of the bearing stage, wherein the support stage is closer to the edge of the display module than the light guide structure is, and the optical film is disposed on a side, facing away from the bearing face, of the light guide structure.

In some embodiments, the frame body further includes: a surrounding structure fixedly connected to the bearing stage, wherein the surrounding structure surrounds the backlight source, and a side, close to a light plate, of the surrounding structure is provided with a reflective layer.

In some embodiments, the optical film includes: at least one of a diffuse plate, a lower prism sheet, and an upper prism sheet.

It should be noted that the display module in the above embodiments and the display module in the above-mentioned embodiments differ in only a part of the structure, and principles of a less width of the overflowed adhesive portion in the display module are the same. Thus, the principle of the display module is not repeated, which can be referred to the display module in the above-mentioned embodiments.

Figure 12:
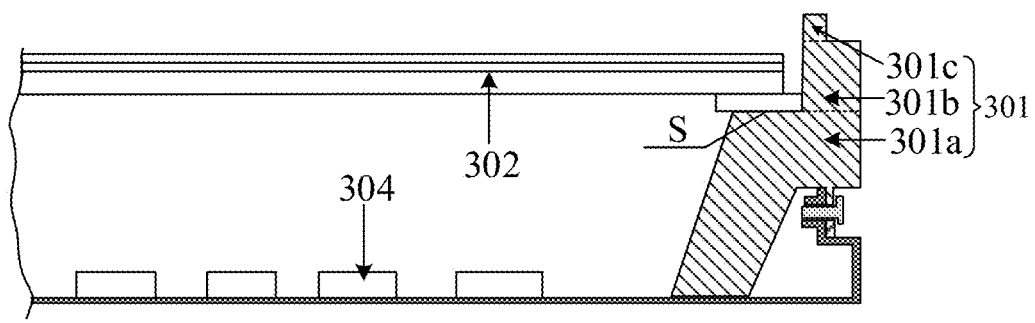
FIG. 12 is a schematic structural diagram of a backlight module according to some embodiments of the present disclosure.

The embodiments of the present disclosure further provide a backlight module. As shown in FIG. 12, FIG. 12 is a schematic structural diagram of a backlight module according to some embodiments of the present disclosure. The backlight module 300 includes a backlight source 304, a frame body 301, and an optical film 302.

The frame body 301 in the backlight module 300 includes a bearing stage 301a, a support stage 301b, and a barrier wall 301c. The bearing stage 301a in the frame body 301 includes a bearing face S for bearing the optical film 302. The support stage 301b in the frame body 301 is affixed to the bearing face S, and the barrier wall 301c in the frame body 301 is affixed to a face, facing away from the bearing face S, of the support stage 301b.

It should be noted that the structures and principles of the display module herein can be referred to the related description of the display module in the above-mentioned embodiments, which are not repeated herein.

The embodiments of the present disclosure further provide a display device. The display device includes a plurality of spliced display modules. The display module is the display module shown in FIG. 3, FIG. 6, FIG. 7, FIG. 8, FIG. 9, FIG. 10, or FIG. 11.

It should be noted that in the accompanying drawings, for clarity of the illustration, the dimension of the layers and regions may be scaled up. It should be understood that when an element or layer is described as being "on" another element or layer, the described element or layer may be directly located on other elements or layers, or an intermediate layer may exist. In addition, it should be understood that when an element or layer is described as being "under" another element or layer, the described element or layer may be directly located under other elements, or more than one intermediate layer or element may exist. In addition, it should be further understood that when a layer or element is described as being arranged "between" two layers or elements, the described layer or element may be the only layer between the two layers or elements, or more than one intermediate layer or element may exist. In the overall disclosure, like reference numerals indicate like elements.

In the present discourse, the terms "first," "second," "third" and the like are only used for the purpose of description and should not be construed as indicating or implying relative importance. Unless otherwise clearly defined, the expression "a plurality of" refers to two or more.

Described above are merely exemplary embodiments of the present disclosure, and are not intended to limit the present disclosure. Any modifications, equivalent replacements, improvements and the like made within the spirit and principles of the present disclosure should be encompassed within the scope of protection of the present disclosure.

The invention claimed is:

1. A display module, comprising:
a display panel;
an adhesive layer; and
a backlight module comprising a backlight source, a frame body, and an optical film, wherein the frame body comprises a bearing stage, a support stage, and a barrier wall, wherein the bearing stage comprises a bearing face configured to bear the optical film, the support stage is affixed to the bearing face, the barrier wall is affixed to a face, facing away from the bearing face, of the support stage, and the barrier wall is disposed on a side, away from an edge of the display module, of the support stage;
wherein the adhesive layer comprises a first adhesive portion, a second adhesive portion, and an overflowed adhesive portion, wherein the first adhesive portion is disposed between the barrier wall and the display panel and is bonded to the barrier wall and the display panel, the second adhesive portion is disposed between the support stage and the display panel and is bonded to the support stage and the display panel, the overflowed adhesive portion is disposed on a side, facing away from the second adhesive portion, of the first adhesive portion and is bonded to the display panel, and the second adhesive portion is closer to an edge of the display module than the first adhesive portion is; and
the display panel comprises a plurality of valid sub-pixels arranged in an array, wherein a maximum width of a cross-section of the overflowed adhesive portion is less than or equal to an overall width of two valid sub-pixels closest to an edge of a display region of the display panel, and the maximum width of the cross-section of the overflowed adhesive portion is greater than 0.

2. The display module according to claim 1, wherein a minimum width $d_1$ of a cross-section of the barrier wall and a width $d_3$ of a side, close to the barrier wall, of a cross-section of the support stage meet: $d_1 \leq d_3/2$.

3. The display module according to claim 2, wherein a face, close to the optical film, of the barrier wall is flush with a face, close to the optical film, of the support stage.

4. The display module according to claim 3, wherein the minimum width $d_1$ of the cross-section of the barrier wall and the width $d_3$ of the side, close to the barrier wall, of the cross-section of the support stage meet: $d_1 \geq d_3/4$.

5. The display module according to claim 1, wherein in a direction perpendicular to a plane of a light exiting face of the display panel, a minimum height h of the barrier wall and a minimum distance H between the support stage and the display panel meet: $H/4 \leq h \leq 3H/4$.

6. The display module according to claim 1, wherein the display module meets at least one of the following requirements:
in a direction perpendicular to a plane of a light exiting face of the display panel, a minimum distance between the display panel and the support stage is greater than or equal to 0.2 mm; and
in the direction perpendicular to the plane of the light exiting face of the display panel, the minimum distance between the display panel and the support stage is less than or equal to 0.5 mm.

7. The display module according to claim 1, wherein a maximum width of a cross-section of the adhesive layer is greater than or equal to 1 mm.

8. The display module according to claim 1, wherein in a direction perpendicular to a plane of a light exiting face of the display panel, a maximum thickness of the overflowed adhesive portion is less than or equal to twice a minimum distance between the display panel and the barrier wall.

9. The display module according to claim 1, wherein the cross-section of the overflowed adhesive portion comprises an adhesive face and an arc-shaped face, wherein the adhesive face is bonded to the display panel, the arc-shaped face is disposed on a side, facing away from the display panel, of the adhesive face, and a maximum distance between the arc-shaped face and the display panel is less than or equal to a maximum distance between the support stage and the display panel.

10. The display module according to claim 9, wherein an area S1' of the cross-section of the overflowed adhesive portion and an area S2' of a cross-section of the barrier wall meet:

$$\frac{\pi \times \left(\frac{H}{0.625}\right)^2}{4} - S1' \leq S2';$$

wherein H represents a minimum distance between the support stage and the display panel.

11. The display module according to claim 9, wherein relevant dimensions of the barrier wall meet:

$$\begin{cases} S1 = \frac{\pi r^2}{4} + \frac{1}{2} \times (b+r) \times (a-r) \\ r = h0 \\ S2 = d_1 \times h \\ \frac{\pi \times \left(\frac{H}{0.625}\right)^2}{4} - S1 \leq S2 \end{cases};$$

wherein H represents a minimum distance between the support stage and the display panel, $d_1$ represents a minimum width of a cross-section of the barrier wall, h represents a minimum height of the barrier wall in a direction perpendicular to a plane of a light exiting face of the display panel, r represents a radius of the arc-shaped face, h0 represents a maximum thickness of the overflowed adhesive portion, b represents a minimum distance between the barrier wall and the display panel, and a represents the overall width of two valid sub-pixels closest to the edge of the display region.

12. The display module according to claim 9, wherein relevant dimensions of the barrier wall meet:

$$\begin{cases} S1 = \frac{\pi r^2}{4} + \frac{1}{2} \times (b+r) \times (a'-r) \\ r = h0 \\ S2 = d_1 \times h \\ \frac{\pi \times \left(\frac{H}{0.625}\right)^2}{4} - S1 \leq S2 \end{cases};$$

wherein H represents a minimum distance between the support stage and the display panel, $d_1$ represents a minimum width of a cross-section of the barrier wall, h represents a minimum height of the barrier wall in a direction perpendicular to a plane of a light exiting face of the display panel, r represents a radius of the arc-shaped face, h0 represents a maximum thickness of the overflowed adhesive portion, b is a minimum distance between the barrier wall and the display panel, and a' represents a distance between an orthogonal projection of an edge, away from the edge of the display region, of a second valid sub-pixel closest to the edge of the display region of the display panel on the display panel and an orthogonal projection of the barrier wall on the display panel.

13. The display panel according to claim 1, wherein a shear resistance strength P of the adhesive layer meets:

$$P \geq \frac{m \times g}{12 \times s};$$

wherein m represents a mass of the display panel, g represents gravitational acceleration, and s represents a minimum area of a cross-section of the adhesive layer.

14. The display module according to claim 1, wherein at least two barrier walls are juxtaposed on a face, facing away from the bearing face, of the support stage, a gap is defined between any two adjacent barrier walls, and the adhesive layer further comprises an auxiliary adhesive portion in the gap.

15. The display module according to claim 1, wherein the display panel further comprises a display region and a non-display region on a periphery of the display region, and a width of a side, close to the barrier wall, of a cross-section of the support stage is less than or equal to a width of the non-display region.

16. The display module according to claim 15, further comprising: a plurality of barrier walls extending along an edge of the display module, wherein the plurality of barrier walls are disposed on a plurality of side faces of the display module, and orthogonal projections of the plurality of barrier walls on the display panel surround the display region of the display panel.

17. The display module according to claim 1, wherein the backlight module further comprises a light guide structure on the bearing face of the bearing stage, wherein the support stage is closer to the edge of the display module than the light guide structure is, and the optical film is disposed on a side, facing away from the bearing face, of the light guide structure.

18. A display module, comprising:
a display panel;
an optical film attached to a light entering face of the display panel;
a frame body on a side, facing away from the display panel, of the optical film, wherein the frame body comprises a support stage and a barrier wall, wherein the barrier wall is affixed to a face, facing away from the bearing face, of the support stage, and the barrier wall is disposed on a side, away from an edge of the display module, of the support stage; and
an adhesive layer comprising a first adhesive portion, a second adhesive portion, and an overflowed adhesive portion, wherein the first adhesive portion is disposed between the barrier wall and the display panel and is bonded to the barrier wall and the optical film, the second adhesive portion is disposed between the support stage and the display panel and is bonded to the support stage and the optical film, the overflowed adhesive portion is disposed on a side, facing away from the second adhesive portion, of the first adhesive portion and is bonded to the display panel, and the second adhesive portion is closer to an edge of the display module than the first adhesive portion;

wherein the display panel comprises a plurality of valid sub-pixels arranged in an array, wherein a maximum width of a cross-section of the overflowed adhesive portion is less than or equal to an overall width of two valid sub-pixels closest to an edge of a display region of the display panel, and the maximum width of the cross-section of the overflowed adhesive portion is greater than 0.

19. A display device, comprising: a plurality of spliced display modules, wherein the display module comprises:

a display panel;

an adhesive layer; and a backlight module comprising a backlight source, a frame body, and an optical film, wherein the frame body comprises a bearing stage, a support stage, and a barrier wall, wherein the bearing stage comprises a bearing face configured to bear the optical film, the support stage is affixed to the bearing face, the barrier wall is affixed to a face, facing away from the bearing face, of the support stage, and the barrier wall is disposed on a side, away from an edge of the display module, of the support stage;

wherein the adhesive layer comprises a first adhesive portion, a second adhesive portion, and an overflowed adhesive portion, wherein the first adhesive portion is disposed between the barrier wall and the display panel and is bonded to the barrier wall and the display panel, the second adhesive portion is disposed between the support stage and the display panel and is bonded to the support stage and the display panel, the overflowed adhesive portion is disposed on a side, facing away from the second adhesive portion, of the first adhesive portion and is bonded to the display panel, and the second adhesive portion is closer to an edge of the display module than the first adhesive portion is; and the display panel comprises a plurality of valid sub-pixels arranged in an array, wherein a maximum width of a cross-section of the overflowed adhesive portion is less than or equal to an overall width of two valid sub-pixels closest to an edge of a display region of the display panel, and the maximum width of the cross-section of the overflowed adhesive portion is greater than 0.

* * * * *